US008840863B2

(12) United States Patent
Yang et al.

(10) Patent No.: US 8,840,863 B2
(45) Date of Patent: Sep. 23, 2014

(54) METHOD FOR SYNTHESISING A NANO-PRODUCT

(75) Inventors: Shihe Yang, Hong Kong (CN); Chenmin Liu, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 372 days.

(21) Appl. No.: 12/549,968

(22) Filed: Aug. 28, 2009

(65) Prior Publication Data
US 2010/0069229 A1   Mar. 18, 2010

Related U.S. Application Data

(60) Provisional application No. 61/190,878, filed on Sep. 4, 2008.

(51) Int. Cl.
| | | |
|---|---|---|
| *C01B 13/14* | (2006.01) | |
| *C01G 25/02* | (2006.01) | |
| *C01G 27/02* | (2006.01) | |
| *C01G 23/047* | (2006.01) | |
| *B01J 21/06* | (2006.01) | |
| *B82Y 30/00* | (2011.01) | |
| *B01J 35/00* | (2006.01) | |
| *C01B 13/36* | (2006.01) | |
| *B01J 27/24* | (2006.01) | |
| *B01J 27/14* | (2006.01) | |
| *B01J 37/10* | (2006.01) | |

(52) U.S. Cl.
CPC .............. *C01G 23/047* (2013.01); *B01J 27/24* (2013.01); *B01J 21/063* (2013.01); *C01P 2004/04* (2013.01); *B82Y 30/00* (2013.01); *B01J 27/14* (2013.01); *B01J 35/004* (2013.01); *C01P 2004/64* (2013.01); *C01P 2002/84* (2013.01); *B01J 21/06* (2013.01); *C01B 13/36* (2013.01); *C01P 2002/52* (2013.01); *C01P 2004/16* (2013.01); *B01J 35/0013* (2013.01); *B01J 37/10* (2013.01); *Y10S 977/70* (2013.01); *Y10S 977/762* (2013.01)
USPC ........ 423/592.1; 423/608; 423/610; 977/700; 977/762

(58) Field of Classification Search
USPC .......... 423/608–610; 977/700, 762, 765, 766, 977/773, 775, 776
See application file for complete search history.

(56) References Cited

U.S. PATENT DOCUMENTS

| | | | | |
|---|---|---|---|---|
| 6,306,736 | B1 * | 10/2001 | Alivisatos et al. | 438/497 |
| 6,855,202 | B2 * | 2/2005 | Alivisatos et al. | 117/68 |

(Continued)

OTHER PUBLICATIONS

Zhang et al., "Aminolysis Route to Monodisperse Titania Nanorods with Tunable Aspect Ratio", Angew. Chem. Int. Ed. 2005, 44, 3466-3470.*

(Continued)

*Primary Examiner* — Anthony J Zimmer
(74) *Attorney, Agent, or Firm* — Nath, Goldberg & Meyer; Jerald L. Meyer; Stanley N. Protigal

(57) ABSTRACT

A method for the synthesis of nano-products, such as atomic titanium oxide wires. The method allows wires of anatase titanium oxide wires to be formed in a range of tunable diameters and aspect ratios in the nanometer and subnanometer size scales. The method also allows the titanium wires to be capped by oleic acid to enhance dispersing and solubility. The method allows the titanium wires to be surface doped with nitrogen species to enhance stability and functionality such as enhanced absorption in the visible wavelength region, which is useful for photodegradation of organic wastes in water by sunlight.

16 Claims, 17 Drawing Sheets
(6 of 17 Drawing Sheet(s) Filed in Color)

(56) References Cited

U.S. PATENT DOCUMENTS

| | | | |
|---|---|---|---|
| 7,118,727 B2 * | 10/2006 | Williams | 423/592.1 |
| 7,311,774 B2 * | 12/2007 | Alivisatos et al. | 117/68 |
| 7,521,394 B2 * | 4/2009 | Xie et al. | 502/350 |
| 7,528,060 B1 * | 5/2009 | Fonseca et al. | 438/609 |
| 7,557,028 B1 * | 7/2009 | Scher et al. | 438/604 |
| 7,662,706 B2 * | 2/2010 | Samuelson et al. | 438/503 |
| 7,709,540 B2 * | 5/2010 | Pan et al. | 516/33 |
| 7,875,536 B2 * | 1/2011 | Samuelson et al. | 438/503 |
| 2005/0214190 A1 * | 9/2005 | Hyeon et al. | 423/299 |
| 2010/0117503 A1 * | 5/2010 | Mizuno et al. | 313/110 |

OTHER PUBLICATIONS

Kim et al., "Solvothermal synthesis of nanocrystalline TiO2 in toluene with surfactant", Journal of Crystal Growth 257 (2003) 309-315.*

Cozzoli et al., "Low-Temperature Synthesis of Soluble and Processable Organic-Capped Anatase TiO2 Nanorods", J. Am. Chem. Soc. 2003, 125, 14539-14548.*

Li et al., "Near Monodisperse TiO2 Nanoparticles and Nanorods", Chem. Eur. J. 2006, 12, 2383-2391.*

Chen et al., "Titanium Dioxide Nanomaterials: Synthesis, Properties, Modifications, and Applications", Chem. Rev. 2007, 107, 2891-2959.*

* cited by examiner

METHOD FOR SYNTHESISING A NANO-PRODUCT

FIELD OF THE INVENTION

The present invention relates to the field of nano-products, such as nanorods, nano-wires and atomic wires. More specifically, the present invention relates to the formation of such nanostructures.

TECHNICAL BACKGROUND

Nanoscale titanium dioxide, $TiO_2$, or titania, has outstanding properties which can be used in wide-ranging areas. For example, $TiO_2$ can be used in heterogeneous catalysis, photocatalysis, solar cells, gas sensor, corrosion-protective coating, electrical devices such as varistors and so on. Thus, many $TiO_2$ nanostructures, including hollow spheres, nanotubes, nanowires, and mesoporous structures have been synthesised.

Typically, $TiO_2$ nanostructures are synthesised by chemical vapour deposition, microwave plasma torch, ultrasonic and electrochemical techniques. Other methods also used include electrospinning, sol-gel, and hydrolysis/alcoholysis of titanium precursors.

However, the most general and versatile solution-phase synthesis strategy is based on the hydrolysis and condensation of titanium alkoxides to create nanosized $TiO_2$, with diameters from a few tens to several hundreds of nanometer. Owing to the very fast hydrolytic process at low temperature, this solution-phase synthesis strategy yields amorphous $TiO_2$ products with polydisperse size and mixed phase, and subsequent hydrothermal processing or calcinations is necessary to induce crystallisation.

Thus, these methods are tedious and the nanostructures produced have average diameters larger than 10 nm, with the smallest at 3 nm.

It is desirable to provide a method for synthesising size-tunable, relatively thin wires down to the atomic scale. Such a method could possibly broaden the application scope and enhance utility of such nano-material.

STATEMENT OF INVENTION

In a first aspect, the invention provides a method of synthesising or producing a nano-product comprising the steps of a) providing a mixture of an M-alkoxide and an unsaturated carboxylic acid, b) heating the mixture for a pre-determined period of time to form an M-complex precursor, c) precipitating a nano-product of M oxide from the M-complex precursor, wherein M is an element, the oxide of which is suitable to form a nano-product.

Preferably, precipitating a nano-product of M-oxide from the M-complex precursor in step c) comprises heating the M-complex precursor at a pre-determined temperature for a pre-determined period of time.

Typically, the M-complex precursor is an ester complex, and the M-alkoxide is titanium alkoxide, zirconium alkoxide, tin alkoxide or cerium alkoxide.

Advantageously, this invention provides the possibility of controlling the size and structure of the nano-products by controlling the temperature and time during the formation of the nano-products, wherein the higher the temperature, the greater the diameter of the nano-products and the longer the period, the longer the lengths of the nano-products. This provides the possibility of slowly growing small and fine crystalline nano- or atomic wires, having diameters as small as 0.3 nanometers.

Furthermore, the esterification of the M-alkoxide in the presence of unsaturated carboxylic acid in ambient air provides the possibility of limiting the presence of water, thus preventing significant hydrolytic process forming amorphous $TiO_2$ products. Preferably, the heating of the mixture for a pre-determined period of time in step b) comprises solvothermally treating the mixture.

Preferably, unsaturated carboxylic acids such as oleic acid are also used as a capping agent, capping onto the surface of the nano-products. Thus, the carboxylic acids act as a surfactant between the nano-product and the medium in which they are dispersed. This possibly improves the disperse-ability of the nano-product.

Preferably, the mixture includes an organic solvent having a boiling point $\geq 180°$ C. at ambient pressure, such as 1-octadecene. This allows the mixture to be sustained at a high temperature such as 150° C. without boiling.

Preferably, the nano-product is formed in the presence of nitrogen containing organic compound such as oleylamine, or a phosphorous-containing organic compound. This provides the possibility of forming crystallized nanostructures which are surface doped by the elements of nitrogen and phosphorus provided by nitrogen- and phosphorus-containing organic compounds. Small nano-products such as atomic wires are usually damaged by intense high-energy electron irradiation, rendering them difficult to observe by electron microscopy. Advantageously, the surface doping provides the possibility of stabilizing small atomic wires so that they can even survive high-energy electron beam irradiation, making possible their study by electron microscopy.

Preferably, the heating of the mixture is done solvothermally and in an autoclave, and between steps b) and c), the method further comprising the steps of bi) precipitating a resulting M-complex precursor, bii) re-dispersing the M-complex precursor precipitate in a second mixture, the second mixture comprising an unsaturated carboxylic acid, a nitrogen containing compound, and an organic compound which has a boiling point $\geq 180°$ C.; and biii) heating the second mixture to at least 180° C. for 1 hour.

Advantageously, the M-alkoxide is esterified in the presence of an unsaturated carboxylic acid when the cyclohexane is heated above its ambient boiling point, to provide high pressure under a solvothermal condition in an autoclave. Optionally, 1-octadecene may be used instead, which is a stable high boiling point solvent, to provide esterification at ambient pressure.

In a second aspect, the invention provides a method of synthesising or producing an atomic wire comprising the steps of precipitating M oxide to form atomic wires in the presence of a dopant-containing organic compound, wherein the dopant-containing organic compound forms a surface doping of the produced atomic wire.

Optionally, the dopant is nitrogen or phosphorus.

Advantageously, the produced nitrogen-doped atomic wires have good adsorption capacity of organic pollutant in water, and can decompose the adsorbed pollutant under visible light illumination, as demonstrated by photodegradation of methylene blue (MB).

BRIEF DESCRIPTION OF THE DRAWINGS

The file of this patent contains at least one drawing executed in color. Copies of this patent with color drawing(s) will be provided by the Office upon request and payment of the necessary fee.

Non-limiting embodiments of the invention, by way of example only, will now be described with reference to the following drawings, in which like reference numerals refer to like parts, wherein.

DESCRIPTION OF EMBODIMENTS

Figure 1:
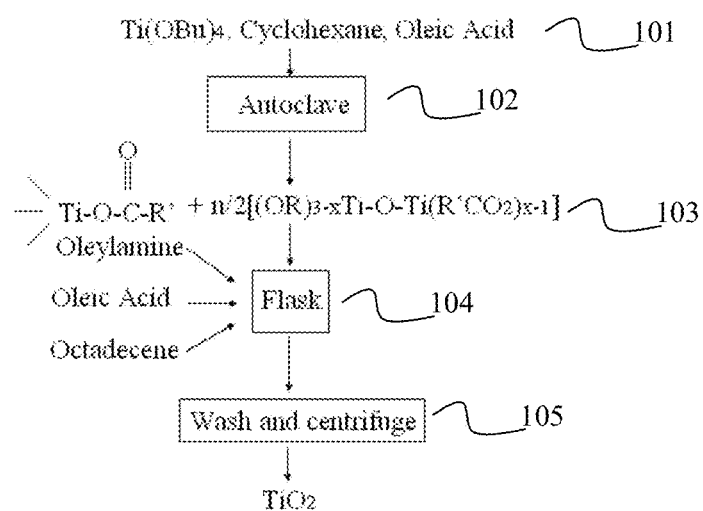
FIG. 1 is flowchart of a first embodiment of the invention.
Figure 1A:
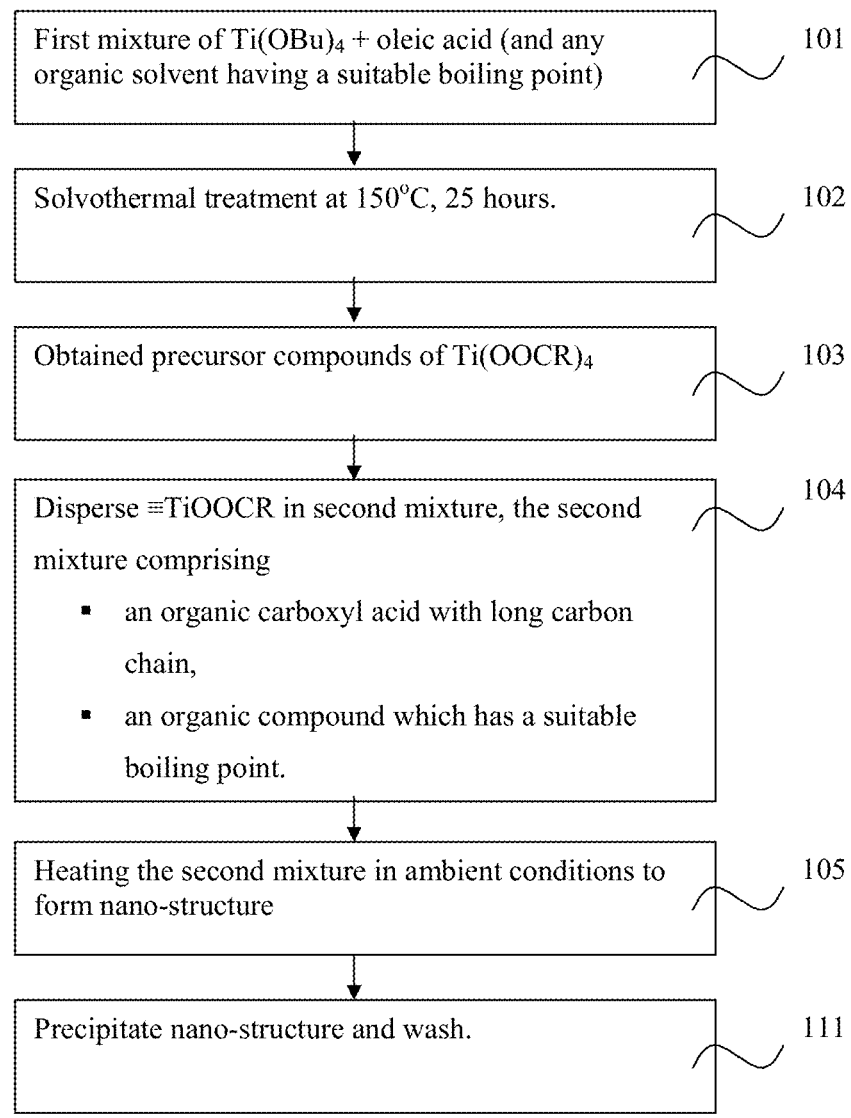
FIG. 1a is complementary flowchart to that of FIG. 1.

FIG. 1 and FIG. 1a are flowcharts of a first embodiment of the invention, wherein anatase atomic wires are synthesised. The skilled reader knows that anatase is one of the mineral forms of titanium dioxide, $TiO_2$.

In the first embodiment, 0.5 ml of titanium butoxide, $Ti(OBu)_4$ where Bu refers to $C_4H_9$, is slowly added dropwise into a container holding a first mixture comprising 3 ml of oleic acid ($C_{17}H_{33}COOH$) and 10 ml of cyclohexane, at step 101.

The resulting solution is sealed in a Teflon-lined stainless autoclave, at step 101, and heated to 150° C. and for 25 hours in a solvothermal procedure. The autoclave provides the possibility of heating cyclohexane in the mixture to 150° C. to an elevated pressure, which otherwise has a boiling point of about 81° C. in ambient pressure. In this situation, the titanium butoxide is non-hydrolytically esterified and dimerised by ester-elimination, according to the following reactions:

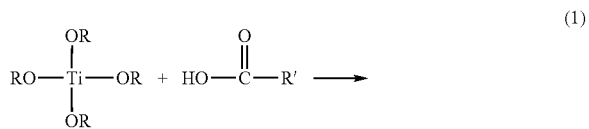

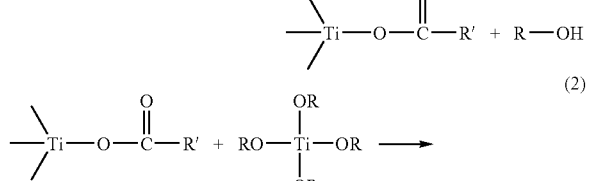

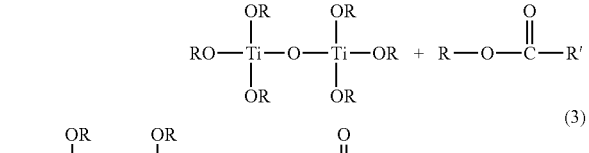

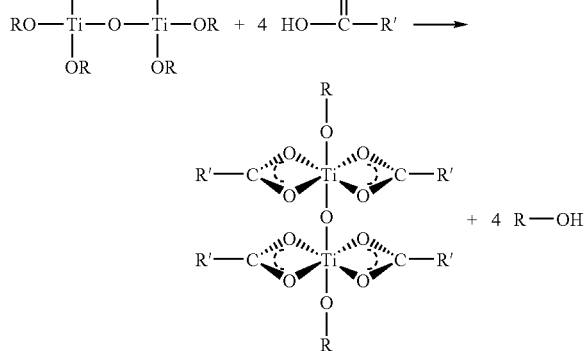

As illustrated in the chemical equations, the titanium butoxide decomposition is based on an efficient esterification reaction that involves chemical modification of reactive molecular precursors with oleic acid.

Thus, a sticky, viscous light yellow but transparent liquid is produced, at step 103, which is the titanium oleate complex and is a precursor complex useable for building titanium oxide nanostructures. The titanium precursor complex is then extracted by precipitation at room temperature, using an excess amount of ethanol.

Although the amount of oleic acid is given as 3 ml, it can be any other amount as long as the amount is sufficient to facilitate efficient esterification of the titanium butoxide. Preferably, the weight ratio of the oleic acid to the titanium butoxide is in the range between 100:3 and 1:1. Beyond this range, too much oleic acid will reduce the purity of the precursor achieved from the first mixture. If too much oleic acid is introduced to the reaction system (>100:3), many by-products will be also formed and co-precipitated with precursor which will affect the quality of the final products. From another aspect, too little amount of oleic acid (<1:1) cannot provide enough capping agent to form the chelated precursor.

Subsequently, the precipitate of the titanium precursor complex is re-dispersed in a second mixture comprising 5 ml 1-octadecene, 0.6 ml of oleic acid and 0.8 ml of oleylamine. The second mixture is then heated to and maintained at 180° C. in a container such as a three-neck-flask with stirring for 1 hour in ambient air. The three neck flask allows control of the temperature and supply of an inert gas over the second mixture. This is called the 'assembly stage', at step 104, where

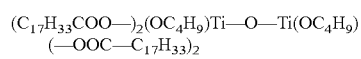

is polycondensed to form atomic $TiO_2$ wires, which is illustrated below.

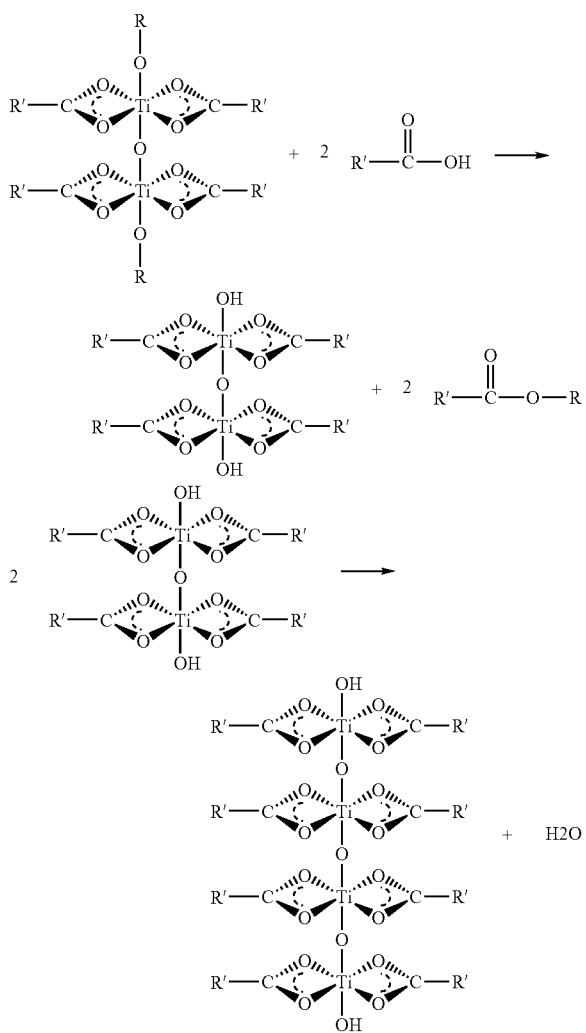

The rate of polycondensation is slow, which encourages crystallisation of small atomic wires, and prevents the formation of an amorphous mixture of $TiO_2$ which would happen if the rate is too fast.

Due to the presence of the oleic acid during crystallisation, the $TiO_2$ atomic wires are protected by an oleic acid-coordination, i.e.

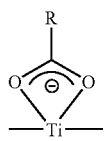

whereby the oleic acid caps onto the surface of the $TiO_2$. This limits side-wise growth of the atomic wires but encourages longitudinal growth. Furthermore, oleic acid advantageously moderates the reactivity of the $TiO_2$ by decreasing the number of TiO—R groups exposed to hydrolysis and condensation.

Preferably, surface N-doping of the $TiO_2$ atomic wires is also achieved, by the presence of organic amines and ambient air. For example, the oleylamine in the second mixture is prone to oxidation to form amine-hydroxide, as shown in reaction (4).

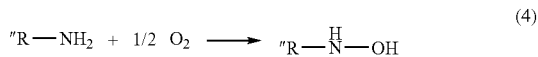 (4)

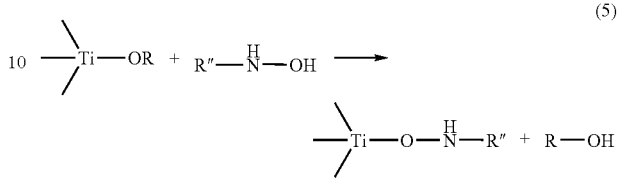 (5)

The oxidized amine is attracted to the parts of the atomic wire surface which are not capped by the oleic acid, in the form of —C—N—O—Ti. The oxidized amine provides nitrogen doping (N-doping) of wire surface. The chemical structure of the dopant and the doped surface is illustrated in reaction (5). The dopant passivates the growing atomic wire, that is, the nitrogen dopant with a long carbon chain can provide not only doping but also a surface shield of the product.

Advantageously, the $TiO_2$ atomic wire crystals are easily dispersed in solvents such as chloroform or hexane, as the oleic acid with long chains on the wire surface acts as a surfactant, without any sign of further growth or irreversible aggregation. Thus, the crystalline, nitrogen-doped, oleic acid capped $TiO_2$ atomic wires are stable, which is a feature desirable for industrial applications.

Figure 1C:
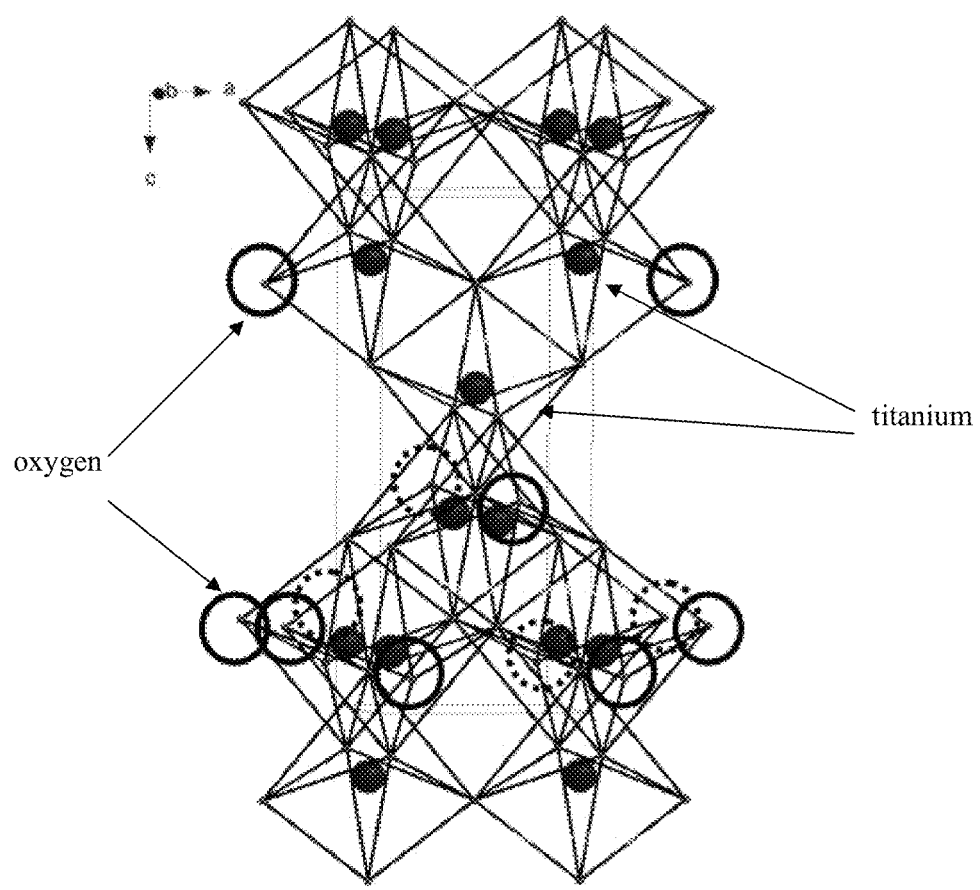
FIG. 1c shows a possible product of the embodiment of FIG. 1.

In other words, while the oleic acid functions as a surfactant, the alkyl amine functions both as a nitrogen dopant and a co-surfactant. Accordingly, parts of the $TiO_2$ are bonded to oleic acid and others to the oxidised amine. FIG. 1c illustrates a crystal of the $TiO_2$ atomic wire, wherein each circle represents an oxygen atom possibly provided by either an oleic acid or a Ti—O—N bond with oleylamine.

Thus, providing the appropriate amount of oleic acid in the assembly stage is preferred for capping and stabilising the atomic wires and preventing lateral overgrowth. The concentration balance between the oleic acid and oleylamine in the mixture may be optimised to obtain stable atomic wires capped with oleic acid. For example, it is preferable to have a concentration ratio of oleic acid to oleyamine of between 1:1 to 1:2. Optionally, if oleic acid is omitted in the second mixture, only small $TiO_2$ particles are obtained. This shows that the amount of oleic acid is related to controlling the morphology of the nano product, in this case the atomic wires.

The trace amount of water present in ambient air is sufficient to allow controlled hydrolysis to form Ti—OH. The very small amount of water vapor in the air is propitious to form Ti—OH, which is an essential fragment for the crystallized $TiO_2$ nanostructures, and the limited water content in the air guaranties the low concentration of the Ti—OH thus avoid the overgrowth of the size of the products.

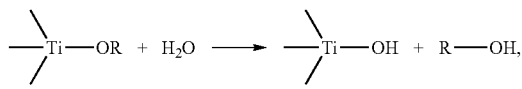

which promotes the formation of the crystallized TiO2 wires but without lateral overgrowth. (We can add hydrolysis reaction as shown above.)

The second mixture thus turns from clear and light yellow to a darker yellow as the condensation reaction proceeds, indicating the crystallisation of nitrogen-doped $TiO_2$ atomic wires. Subsequently, the nitrogen-doped $TiO_2$ atomic wires are extracted from the second mixture in air and at room temperature, again by adding an excess of ethanol. Preferably, the precipitate is further purified by centrifugation and washed twice with ethanol to remove residual surfactants at step 105.

Accordingly, the embodiment is a method of producing a nano-product comprising the steps of (a) providing a mixture of an M-alkoxide (e.g. titanium butoxide) and an unsaturated carboxylic acid (e.g. oleic acid), at step 101, (b) heating the mixture for a pre-determined period of time, at step 102, (c) precipitating the nano-product of M oxide (e.g. titanium oxide), at step 104, wherein M is an element (titanium), the oxide of which is suitable to form a nano-product (atomic wires). Preferably, precipitating a nano-product of M-oxide from the M-complex precursor in step c) comprises heating the M-complex precursor at a pre-determined temperature for a pre-determined period of time. Advantageously, the higher the temperature, the greater the diameter of the nano-product and the longer the period, the longer the lengths of the nano-product.

The described embodiment is a non-hydrolytic approach to the synthesis of anatase titania nano- or atomic wires and shall be known herein as the 'two-stage process', comprising a first decomposition stage for forming the titanium complex precursors in solvothermal treatment, at step 103, followed by the 'assembly stage', at step 104, wherein the controlled decomposition of Ti-containing reagents in ambient and the subsequent assembly of $TiO_2$ provides the possibility of synthesising nitrogen-doped $TiO_2$ (N:Ti in the range between 0:1 and 1:2) nano- and atomic wires.

Furthermore, the embodiment provides the possibility of by fine-controlling the growth of nano-products, e.g. by providing the possibility of adjusting the composition of the reagents including M-alkoxide, oleic acid and oleylamine, the reaction temperature, and reaction time. Accordingly, the embodiment provides the possibility of synthesising monodispersed $TiO_2$ wires (whether they be N-doped or non-doped) with selective diameters. Experiment data shows that the first embodiment allows selective tuning of the wire diameters between 0.3 and 0.5 nm, which virtually reaches to the atomic limit.

In a variation of the first embodiment, the assembly stage, at step 104, heats the second mixture up to 300° C. for 1 hour in a gas stream of ambient air, at step 104. Experiment data shows that $TiO_2$ nanorods with diameters of about 3 nm and lengths of about 15 nm are producible at this higher temperature.

In another variation of the first embodiment, other kinds of alkyl carboxylic acids are used in place of oleic acid to form the titanium precursor complex, such as stearic acid. The size and structure of the selected alkyl carboxylic acid affects the composition and stability of the titanium precursor complex during heating, as well as the structure and morphology of the nano-product. Using stearic acid provides the possibility of obtaining $TiO_2$ nanorods having a higher aspect ratio, and a uniform diameter of about 2 nm to a uniform length of about 30 nm. Furthermore, using stearic acid provides the possibility of obtaining branched nanostructures.

Figure 2:
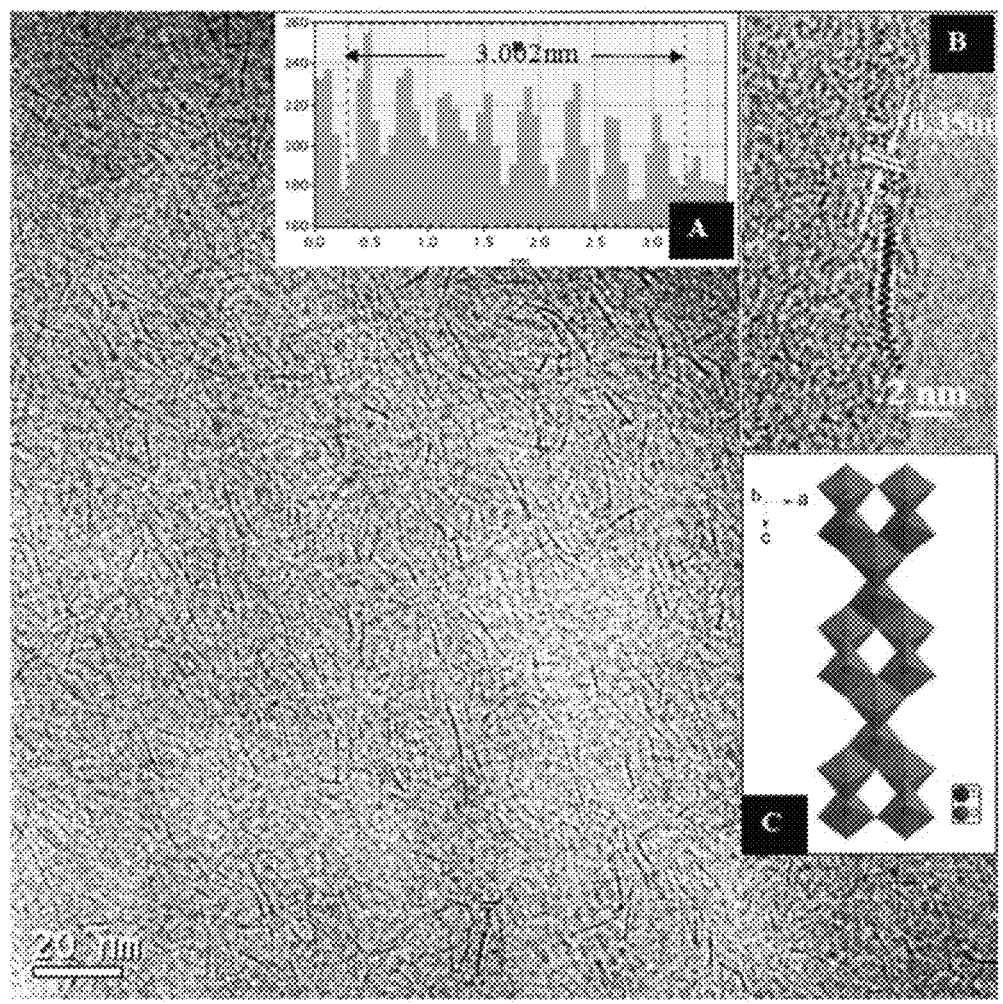
FIG. 2 is a TEM image of exemplary nitrogen-doped $TiO_2$ atomic wires produced by the first embodiment of FIG. 1.

Tests characterising the atomic wires possibly produced by the described embodiments will now be discussed, FIG. 2 is a TEM (transmission electron microscope) image of nitrogen-doped $TiO_2$ atomic wires produced by the first embodiment. Inset A of FIG. 2 shows a graph for calculating the lattice spacing using a digital micrograph software. Inset B is a HRTEM (high resolution transmission electron microscope) image of a single anatase atomic wire. Inset C shows a proposed structure of the $TiO_2$ atomic wires observed by the TEM.

More specifically, FIG. 2 shows abundant, well-separated atomic wires with lengths up to 20 nm and diameters of 0.3-0.5 nm. The atomic wires are well dispersed on the copper grid because of the protective surface layer of oleic acid.

Oleic acid serves as both surfactant and protective layer. In the reaction process, oleic acid bond to the surface of the products to limit the growth of some special crystal faces thus to control the one dimensional growth. From this point, oleic acid is a surfactant. On the other hand, oleic acid remains on the surface of the products via chelating bond, which protect the product from aggregation and further overgrowth, actually, some surface atoms in the crystal structure of the products are provided by oleic acid, as shown in the red circle of FIG. 1c. Taken in this sense, oleic acid is also a protection together with oleylamine. Also, oleic acid is much more abundant than N-dopant on the wire surface. Inset B shows a well-crystallized structure with the lattice fringes of about 0.35 nm (obtained from an average of 8 fringe spacings as shown in the blue line in the inset of FIG. 2), corresponding to the spacing between the <101> planes of the $TiO_2$ atomic wires.

Figure 3:
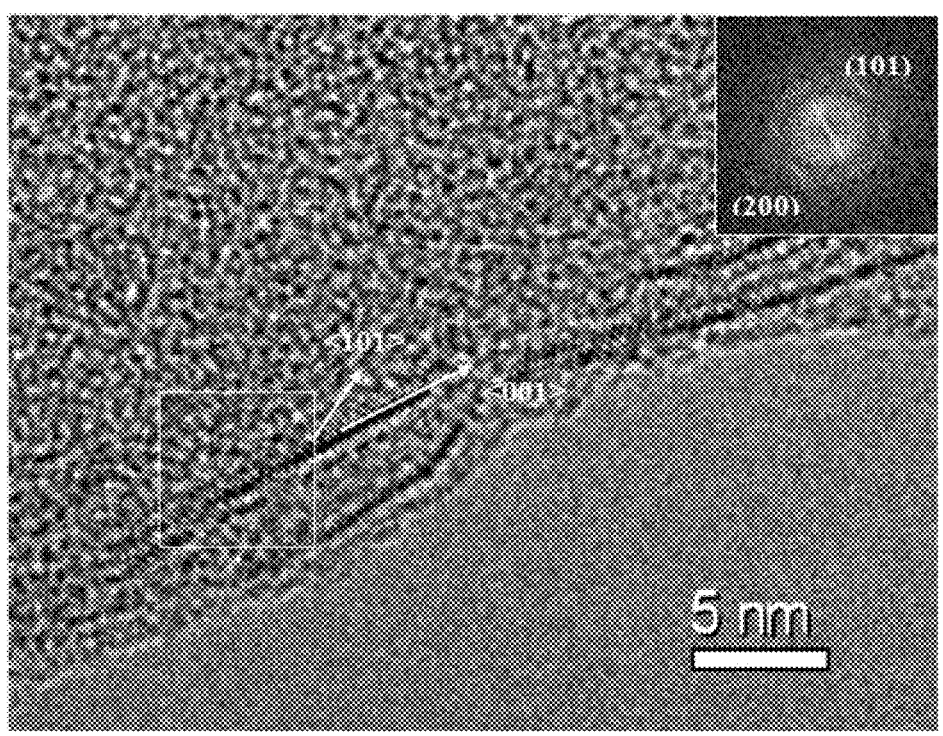
FIG. 3 is a HRTEM image of exemplary nitrogen-doped $TiO_2$ atomic wires produced by the first embodiment of FIG. 1.

FIG. 3 shows an even higher-magnification HRTEM image, further revealing that the $TiO_2$ atomic wires grow along the <001>. The corresponding Fast Fourier Transformation (FFT) pattern is also given in the inset of FIG. 3 to confirm the expected structure of the atomic wires, that is, the crystal is formed by packed planes in the <101> direction.

Figure 4:
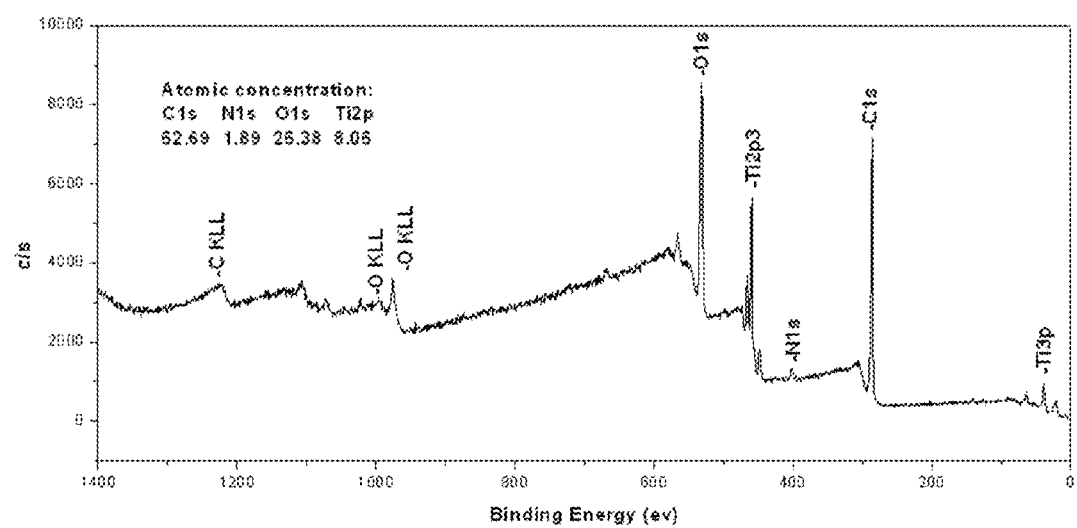
FIG. 4 is a XPS survey spectrum of nitrogen-doped $TiO_2$ atomic wires produced by the first embodiment of FIG. 1.
Figure 5:
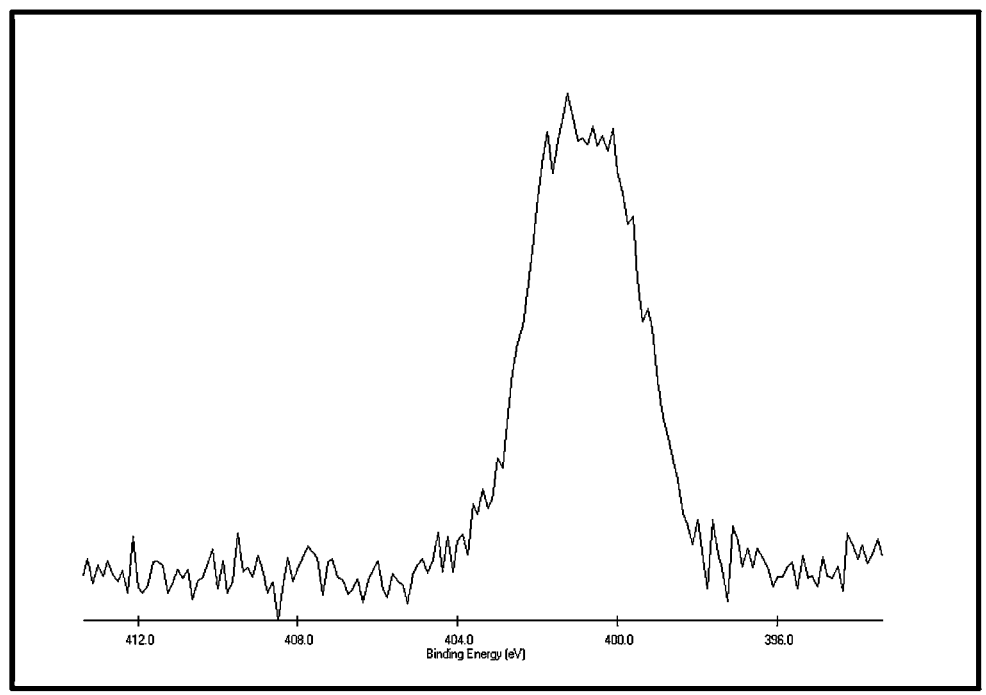
FIG. 5 is a N is spectrum of nitrogen-doped $TiO_2$ atomic wires produced by the first embodiment of FIG. 1.

FIG. 4 is an XPS spectrum showing the element concentrations in the atomic wires, indicating the presence of Ti 2p (near 460 eV) and the N 1s (about 400 eV). This supports the conclusion that the $TiO_2$ has surface N-doping. Furthermore, FIG. 5 shows that the relatively high intensity of N 1s peak (atomic ratio of Ti:N=4.2) proves the existence of N-dopant in the atomic wire product. Moreover, the N 1s peak for the doped $TiO_2$-based atomic wire is centered at around 401.0 eV, extending from 397 to 405, which is notably higher than its typical binding energy, 397.2 eV, in TiN. As the core electron binding energy of an atom is usually higher when the oxidation state of the atom is more positive, the N 1s peak can only be ascribed to nitrogen species in a higher oxidation state, such as NC or NCO, or to an NO site within a $TiO_2$. This is further indicative that the N-doping of the $TiO_2$ atomic wires.

Figure 6:
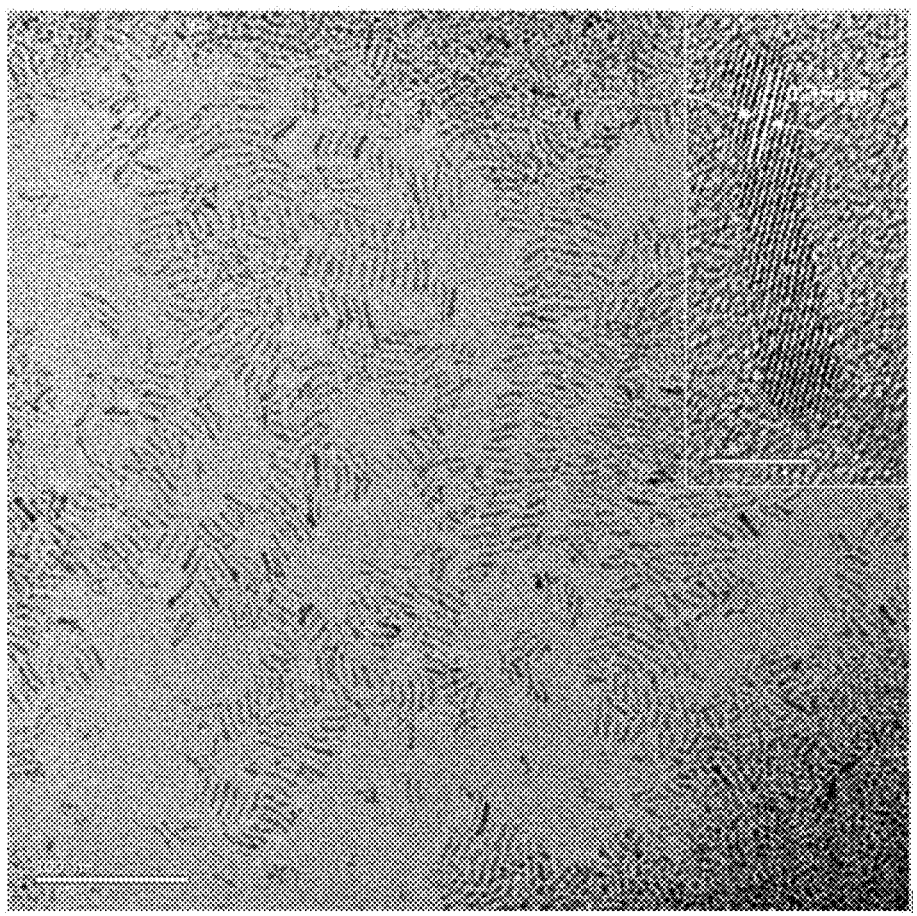
FIG. 6 is a typical TEM image of assembled $TiO_2$ nanorods pattern produced by a variation of the embodiment of FIG. 1.

FIG. 6 is a TEM image of nanorods made by the variation of the first embodiment, in which the $TiO_2$ nanorods are prepared in the same way as the first embodiment except that titanium complex precursor is allowed to crystallize in the assembly stage at a higher temperature of 300° C., and for 1 h in a gas stream of ambient air. FIG. 6 shows that the products of the embodiment are entirely nanorods with a uniform length of about 15 nm and uniform diameter of about 3 to 4 nm. The nanorods are well dispersed on the grid and free of bundling because of the oleic acid protective coating. The HRTEM image in the insert to FIG. 6 exposes the excellent single crystal nature of the nanorods growing along the <001> direction.

Figure 7:
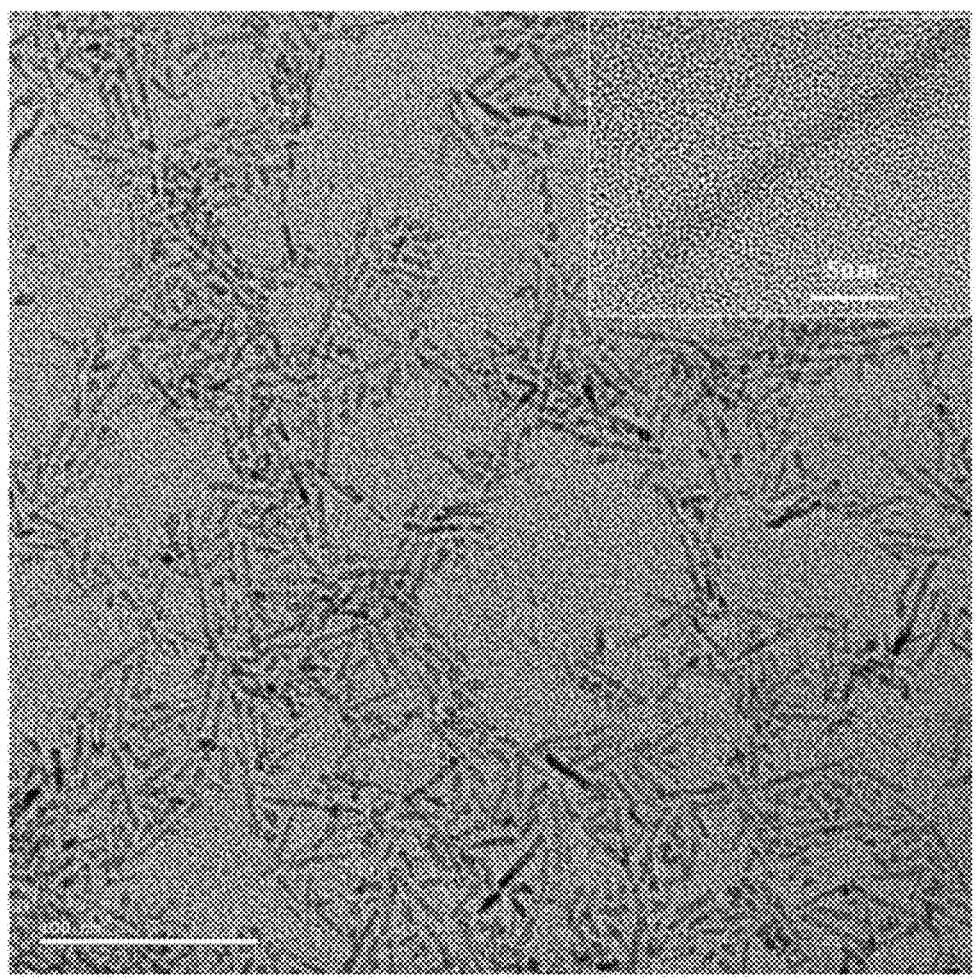
FIG. 7 is a typical TEM image of $TiO_2$ nanorods produced by a variation of the embodiment of FIG. 1.

FIG. 7 shows nanorods produced by another variation of the first embodiment in which stearic acid is used instead of oleic acid. The resulting nanorods have a uniform diameter of about 2 nm and uniform length around 30 nm with a tendency of branching.

Figure 8:
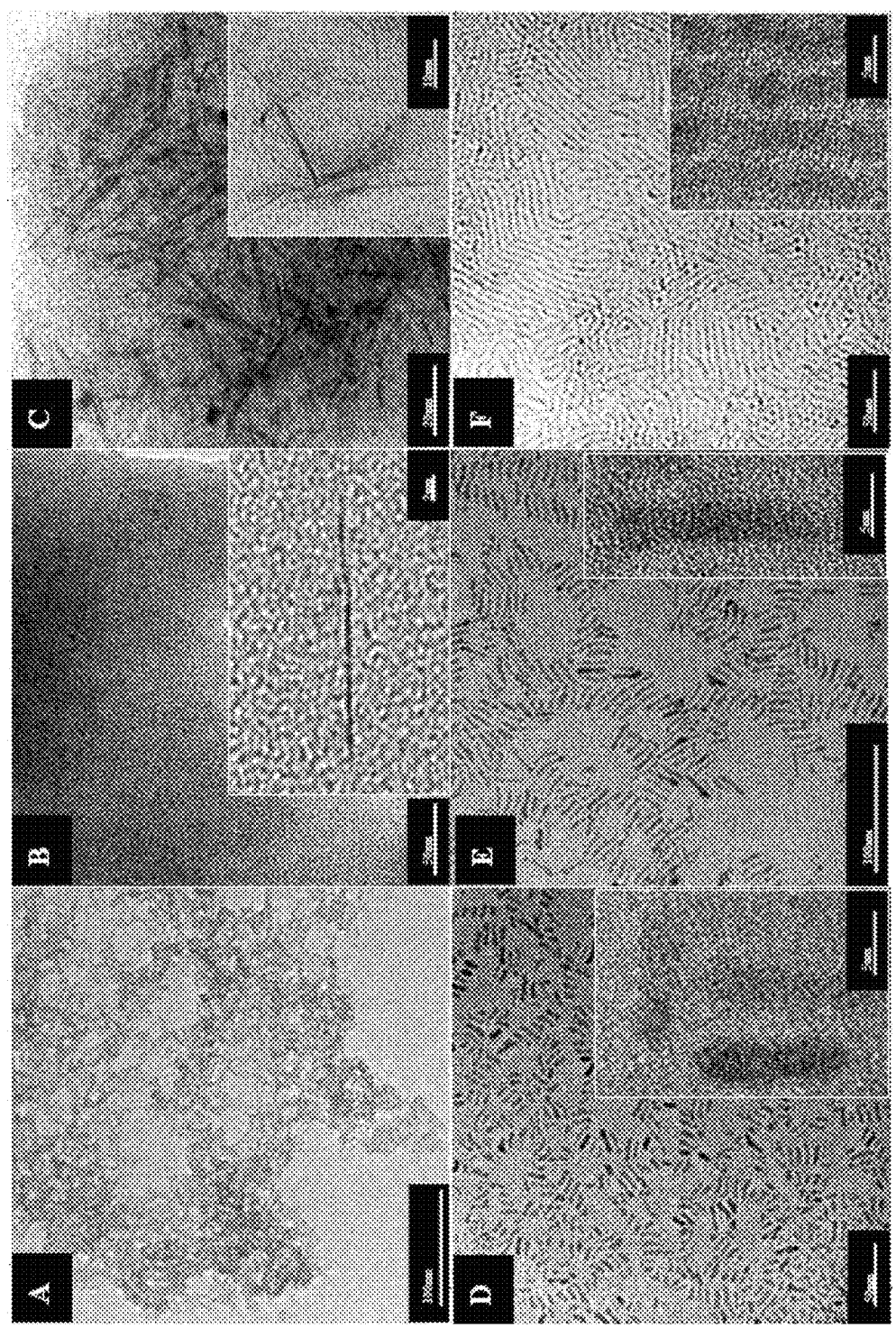
FIG. 8 is typical TEM images showing the evolution of products, produced by the first embodiment of FIG. 1, from Ti-complex precursor to anatase titania atomic wires and nanorods and their self-assembled networks.

FIG. 8 is the TEM images of the nano-products collected after assembly stage treatment under different temperatures and different reaction time. The titanium precursor complex obtained from the first stage, i.e. the solvothermal treatment, is an amorphous gel network, without any crystalline material (A).

After the heat treatment at 180° C. for 1 h in the presence of ODE, in the assembly stage, well dispersed atomic wires with a mean diameter of about 4.5 Å and a mean length of about 20 nm are achieved (B).

Alternatively, if at the assembly stage, the same solvothermally prepared precursor is treated instead at a higher temperature of 180° C. for 12 hours, long and bundled atomic wires are formed with an average diameter of 0.5 nm and an average length of about 38 nm (C).

Alternatively, if at the second stage, the heat treatment is conducted instead at a higher temperature of 300° C. for 20 minutes, well dispersed nanorods with a mean diameter of about 3 nm and length of about 11 nm are obtained (D). If the assembly stage process is prolonged to 1 hour, nearly monodispersed nanorods are obtained having virtually the same mean diameter of about 3 nm but a mean length increase to about 19 nm (E). If the second heating process is yet further prolonged to 3 hours, a self-assembled pattern of bundled nanorods is observed, a typical example of which is shown in FIG. 8F.

Therefore, a longer heat treatment time tends to increase the lengths but not the diameters of the atomic wires, and favours bundling and self-assembly of the atomic wires. A higher temperature, however, favours the formation of greater diameters.

Table 1 summarizes the synthesis results obtained from a series of experiments, clearly showing the effects of the reaction conditions on the size and morphology of the atomic wires.

TABLE 1

Summary of size and shape of the products obtained under various assembly stage conditions.

| Temp. [° C.] | Duration [h] | Morphology | Mean dia. [nm] | Mean length [nm] |
|---|---|---|---|---|
| 180 | 1 | Separated atomic wires (>90%) | 0.5 ± 0.1 | 20.0 ± 3.8 |
| 180 | 12 | Bundled atomic wires (>80%) Nanodots (<20%) | 0.5 ± 0.2 | 38.2 ± 5.3 |
| 300 | 1/3 | Nanorods | 3.1 ± 0.2 | 11.7 ± 3.3 |
| 300 | 1 | Nanorods | 3.0 ± 0.2 | 18.6 ± 2.3 |
| 300 | 3 | Nanorod network pattern | 3.0 ± 0.2 | — |

The parameters were estimated from the TEM data.

Figure 9:
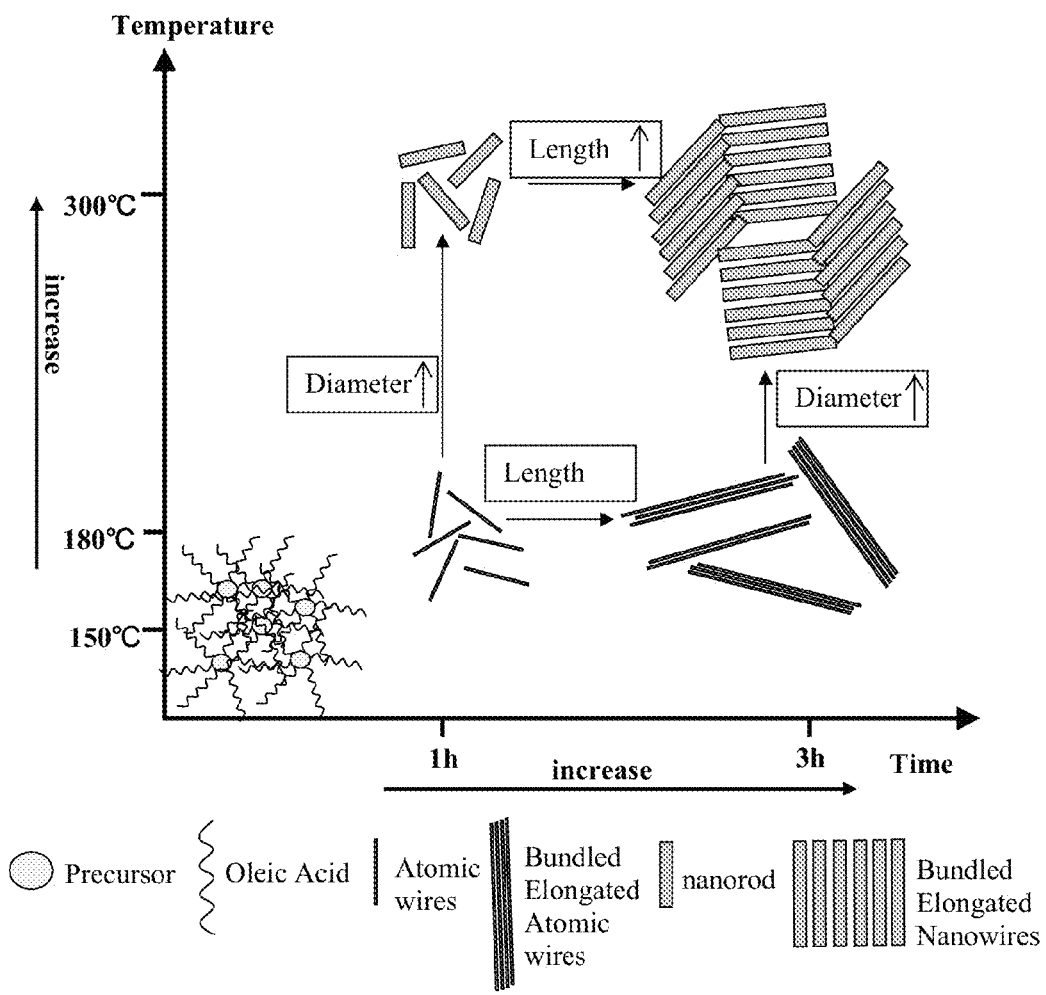
FIG. 9 is a schematic representation illustrating the morphological evolution of the products, produced by the first embodiment of FIG. 1, as a function of reaction temperature and time.

The table is also schematically illustrated in FIG. 9, showing that increase of reaction temperature during the assembly stage mainly increases wire diameter. Furthermore, the prolonging of the assembly stage treatment time mainly increases atomic wire length, accompanied by bundling and self-assembly promoted by the presence of oleylamine.

Figure 10:
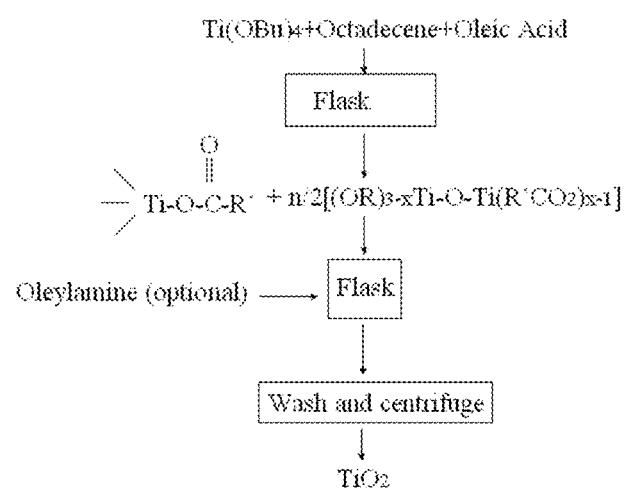
FIG. 10 is flowchart of a first embodiment of the invention.
Figure 10A:
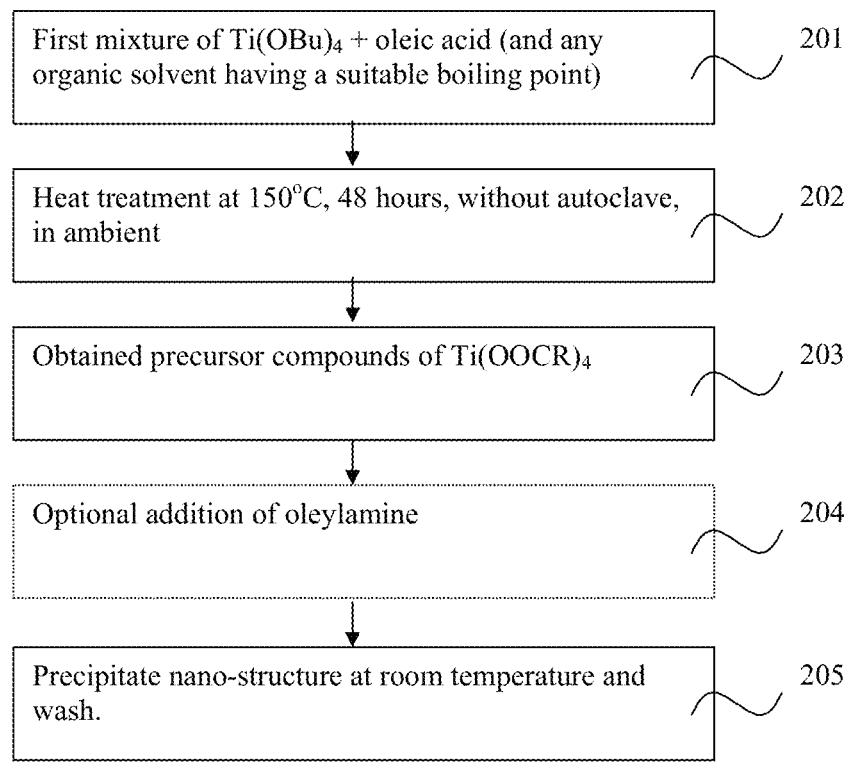
FIG. 10a is complementary flowchart to that of FIG. 1.

In a second embodiment, anatase $TiO_2$ atomic wires is synthesised using a one-stage method, i.e. without a separate solvothermal treatment stage to prepare the titanium precursor complex separately. The embodiment is illustrated in the flowcharts of FIG. 10 and FIG. 10a.

0.5 ml of $Ti(OBu)_4$ is slowly added dropwise, at step 201, into a mixture of 3.5 ml of oleic acid and 10 ml of 1-octadecene. The resulting solution is sealed in a three-neck-flask with stirring and heated to 150° C., and kept for 48 h in ambient conditions, at step 202. The use of autoclave is not included in this embodiment. The long period of reaction time permits the esterification reaction forming the titanium precursor complex and also the polycondensation reaction, at an elevated temperature, leading to the formation of the atomic wires to occur, without requiring a separate precipitation stage for the titanium precursor complex. That is, under an ambient pressure of 1 atmosphere, after the formation of the precursor, a prolonged reaction time favours the following reaction:

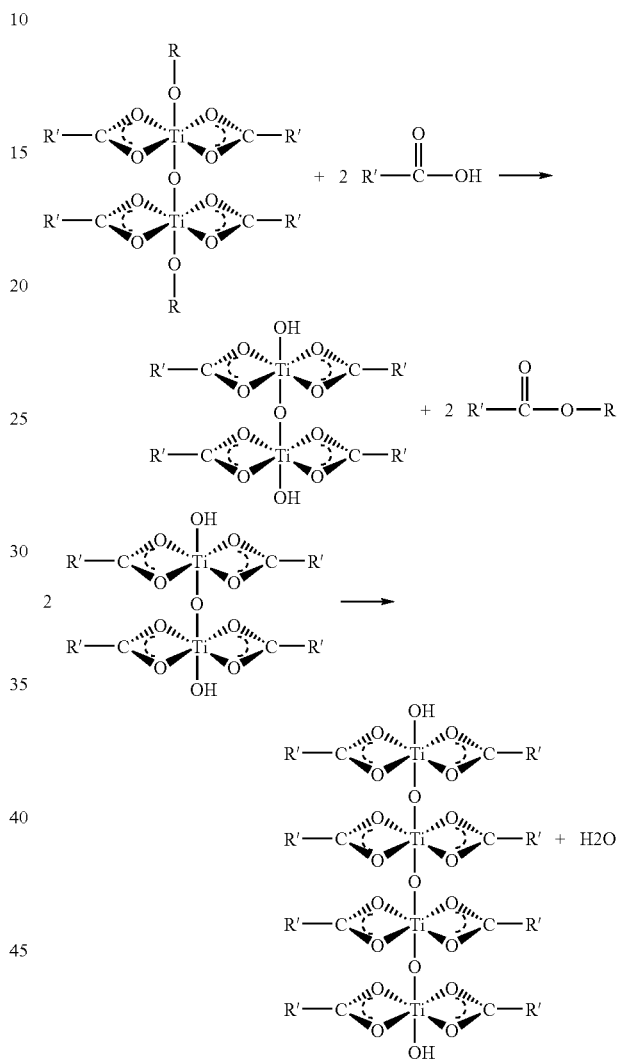

Thus the atomic wires were also observed via such reaction condition. However, both the quality and the yield of the final products are inferior to those obtained via the two stage method of the first embodiment, as shown in the comparison figure of FIG. 11. This is because that under normal pressure, the yield of precursor is lower, and the precipitation of precursor step, the temperature for the assembly stage is lower than that for two-step method.

The resultant nano-product is extracted at room temperature. Upon adding an excess of ethanol to the reaction mixture, $TiO_2$ atomic wires are precipitated, at step 203. The precipitate is further purified by centrifugation and washed twice with ethanol to remove residual surfactants, at step 205.

As in the first embodiment, although the amount of oleic acid is given as 3 ml, it can be any other amount as long as the amount is sufficient to facilitate efficient esterification of the titanium butoxide. Preferably, the weight ratio of the oleic acid to the titanium butoxide is in the range between 100:3 and 1:1.

As in the first embodiment, the produced $TiO_2$ atomic wires are protected by an oleic acid-coordination and are easily re-dispersed in solvents such as chloroform or hexane, without any sign of further growth or irreversible aggregation.

Optionally, an amount of oleylamine, about 1.5 ml, is injected into the mixture when the reaction is in its $47^{th}$ hour, at step 204, which provides surface N-doping of the $TiO_2$ atomic wires.

Figure 11:
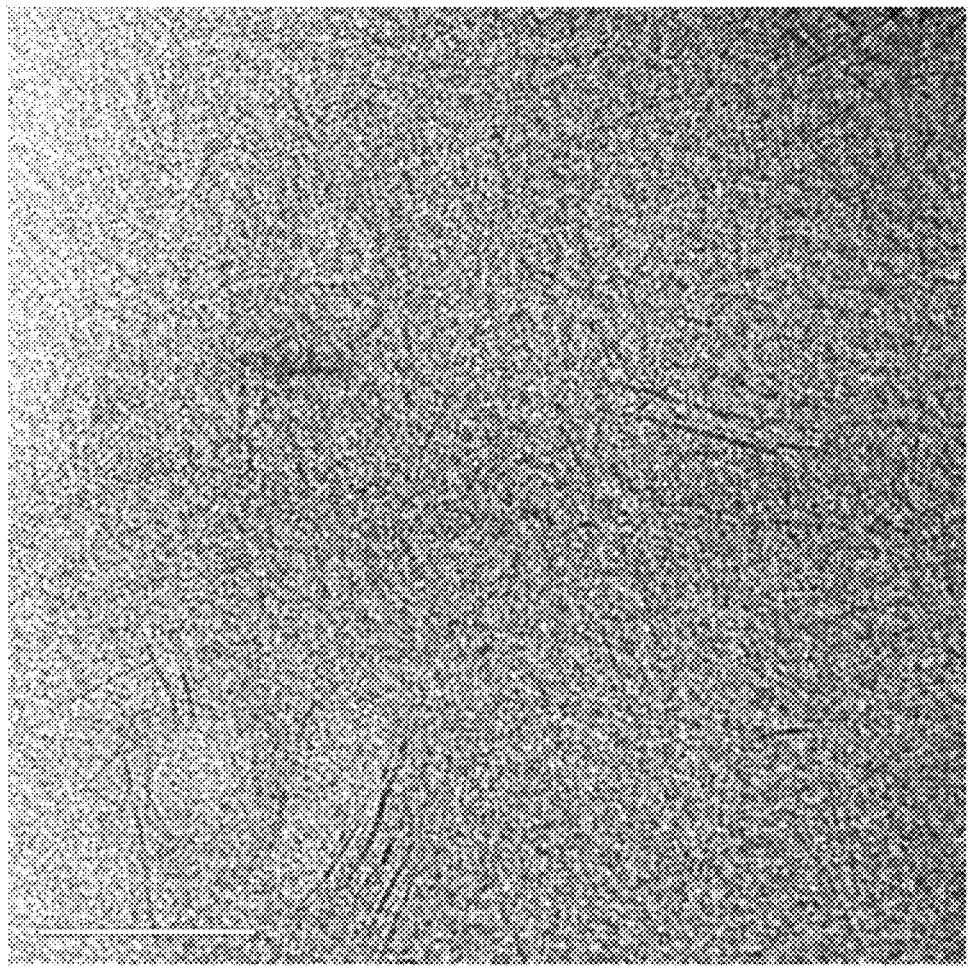
FIG. 11 is a typical TEM image of $TiO_2$ atomic wires produced by the embodiment of FIG. 10.

FIG. 11 is a TEM image showing that the wires produced by the second embodiment are virtually all atomic wires.

Accordingly, there are described a one-stage embodiment and a two-stage embodiment for the controlled growth of extremely thin nitrogen-doped $TiO_2$ atomic wires surface-modified by long-chain carboxylic acid. The atomic wires are very uniform and highly dispersible in common organic solvents.

Advantageously, the embodiments provide the possibility of producing very thin nano- or atomic $TiO_2$ wires, with the possibility of tuning the diameters of the nano- or atomic wires between 0.3 to 5 nm and lengths from 30 to 5 nm, or the branching of the nano- or atomic wires, by varying the reaction temperature, reaction time and choice of reagents during the precipitation or the crystallisation of the of the nano- or atomic wires.

Figure 12:
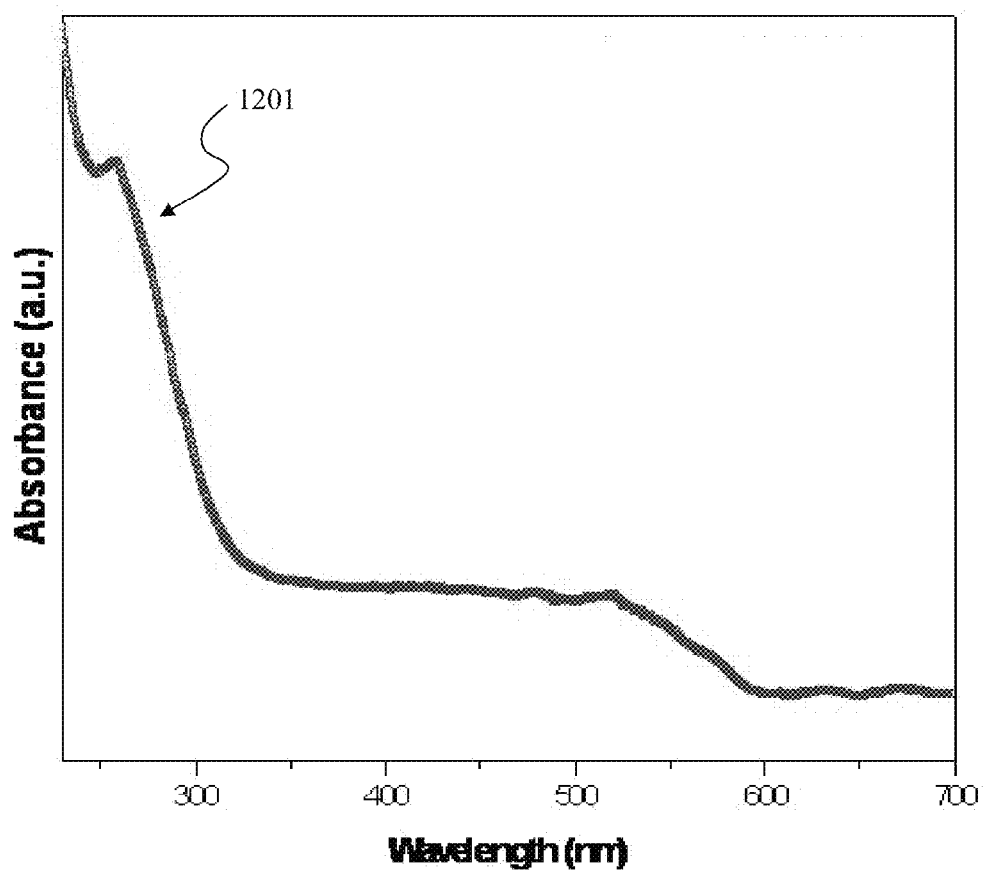
FIG. 12 is an ultraviolet-visible absorption spectrum of atomic wires produced by the embodiment of FIG. 1.

FIG. 12 is the absorbance spectrum 1201 of the $TiO_2$ atomic wires produced by the described embodiments, showing that dopants such as nitrogen enable absorption of visible wavelengths (400 nm to 700 nm). This feature advantageously allows photocatalytic degradation of organic waste products using sunlight and is further explained in FIG. 13, which illustrates absorbance spectra illustrating the adsorption efficacy of organic compounds, methylene blue (MB) in this case, on the atomic wires for photo-degradation.

Typically, organic pollutants may be treated by allowing the pollutants to adsorb to nano-size $TiO_2$, such as P25 nanoparticles (average size 25 nm). The small size of the nanoparticles means there is a large surface area with which the pollutants may interact. Advantageously, the small size of the atomic wires produced by the above embodiments provides an even greater surface area than the nanoparticles. To illustrate this, 4 mg of atomic wires is added into a 2 mL centrifuge tube filled with a methylene blue solution prepared in de-ionised water (20 mg/L). The methylene blue is used to show how pollutants behave with the atomic wires.

The solution is then subject to ultrasonication in darkness for less than 10 minutes, immediately followed by centrifugation. The supernatant is then found to have turned completely colourless and clear while the atomic wires precipitated by the centrifugation have a blue colour. This is because the methylene blue has adsorbed to the atomic wires.

In comparison with a control experiment, 8 mg of P25 nanoparticles of $TiO_2$ (which is far larger in size than the atomic wires) is used instead of the atomic wires. Even after over 1 hour of ultrasonication, no obvious discolouration is observed after the centrifugation step.

Figure 13:
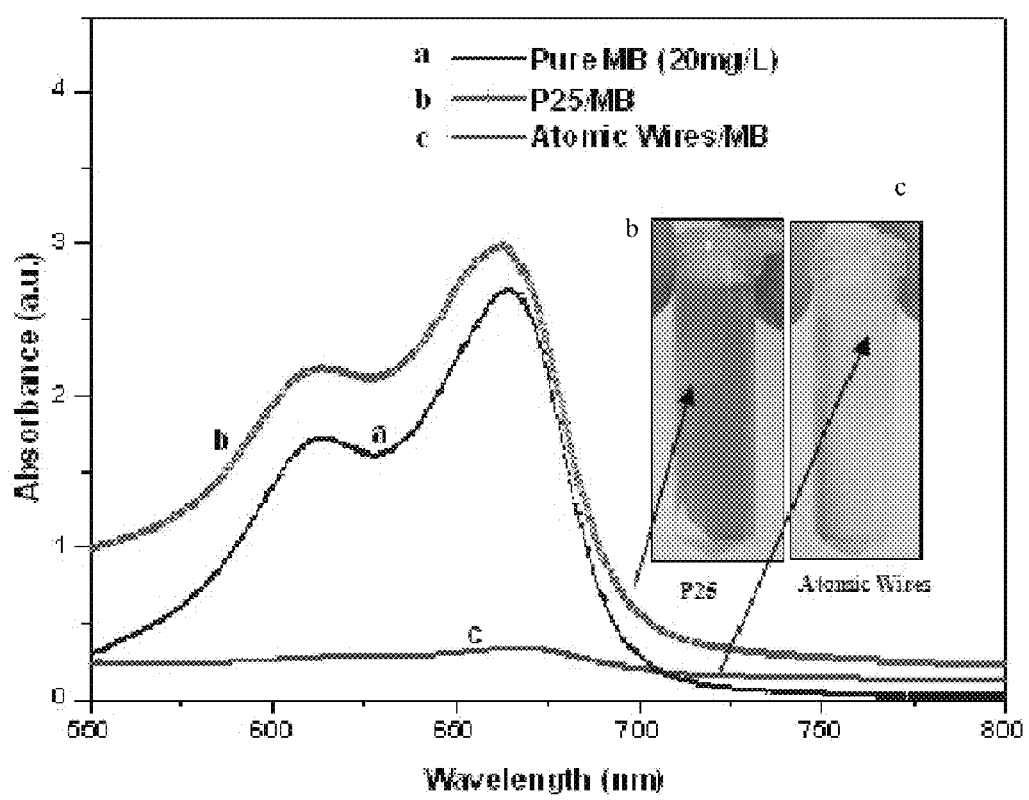
FIG. 13 shows the ultraviolet-visible absorption spectra illustrating efficient adsorption of methylene blue on the atomic wires produced by the embodiment of FIG. 1.

FIG. 13 inset (b), which is pointed at by the arrow extending from the spectrum b, is a picture showing that there is no discolouration in the supernatant in the sample containing P25 nanoparticles. In contrast, inset (c), which is pointed at by the arrow extending from the spectrum c, shows that the supernatant in the sample containing the atomic wires is colourless and clear. This shows the remarkable adsorbing ability due to the exceptionally large surface-to-volume ratio of the atomic wires.

FIG. 13 also shows the UV-visible spectra of the sample, showing that the atomic wires have adsorbed about 90% of the methylene blue in the solution, whereas the adsorption of methylene blue to the P25 nanoparticles is negligible.

Figure 14:
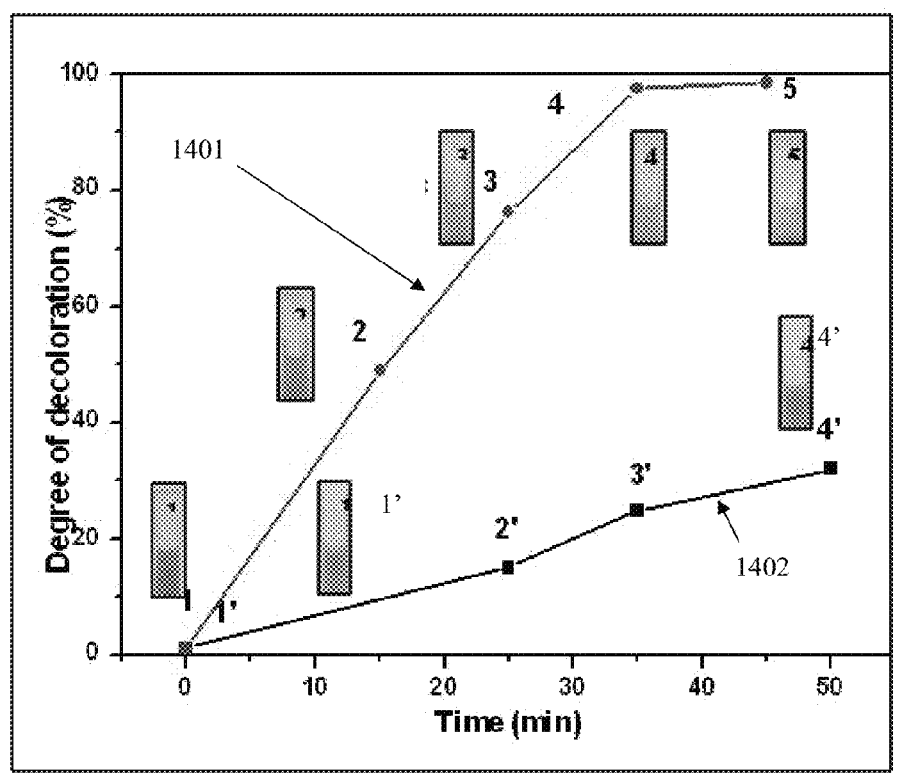
FIG. 14 further illustrates efficient photocatalytic degradation of methylene blue by the atomic wires produced by the embodiment of FIG. 1.

Furthermore, if the samples are not subject to centrifugation after adsorption, but to photocatalytic degradation under irradiation of visible light (wavelength $\lambda$>400 nm), the rate of degradation of the methylene blue can be seen, as shown in FIG. 14. In FIG. 14, the photodegradation of the atomic wire sample is seen to change from blue to colourless (progressing form 1, 2, 3, 4 to 5 along the upper graph line 1401. In contrast, the P25 sample does not show significant discolouration (progressing from 1' to 4') along the lower graph line 1402. By monitoring the visible adsorption peak of methylene blue as a function of irradiation time, the rate of discolouration may be estimated.

It is seen that the degree of discolouration of the atomic wire sample 1040 reaches almost 100% in <35 minutes. Evidently, the atomic wires display a much higher photocatalytic activity than that of the P25 nanoparticles.

In an industrial application such as in water treatment, the atomic wires is introduced into polluted water and to allow pollutant to adsorb onto the surface of the atomic wires, so as to clean the water. This significantly concentrates the pollutant on the atomic wires for subsequently photodegradation. Accordingly, the water treatment can be conducted in two steps, the first being the pollutant adsorption and the second being photodegradation.

While there has been described in the foregoing description embodiments of the present invention, it will be understood by those skilled in the technology concerned that many variations or modifications in details of design, construction or operation may be made without departing from the scope of the present invention as claimed.

For example, the skilled man understands that although nano- and atomic wires have been described, it is understood that the invention applies to both and also other nano-structures such as branched nanowires. The definitions of nanorods, nanowires and atomic wires are not hard and fast, although it is generally understood that the aspect ratios of nanowires is bigger than that of nanorods, for example.

Furthermore, the skilled man understands that deviations from the given embodiments are included within the scope of the invention. For example, other than titanium oxides, other conceivable compounds suitable for producing nano- or atomic wires are included with the scope of the invention, such as any M-alkoxide compounds having an —O—M—O— chain structure (e.g. —O—Ti—O— in the given embodiments), where M is a suitable element for forming an oxide nanowires or atomic wires, such as zirconium or silicon alkoxides.

Furthermore, although is has been described that the dopant is nitrogen provided by a nitrogen-containing organic compound such as organic amine, the skilled man understands that other element such as phosphorus suitable for the surface doping of the nano-products may be used. For example, the dopant may be phosphorus provided by a phosphorus-containing organic compound such as organic phosphine. Where phosphorus is used, nano- or atomic wires of phosphorus-doped $TiO_2$ (the ratio of P:Ti is in the range between 0:1 an 1:2) are obtained.

Furthermore, although titanium butoxide is described in the embodiment, the skilled man understands that any other suitable alkoxides of suitable chain length may be used, such as titanium tetrabutoxide or titanium tetra-isopropoxide.

Furthermore, the skilled man understands that the long-chain carboxylic acid is not limited to oleic acid and stearic acid, and other forms of long-chain carboxylic acid may be used, such as and linoleic acid and arachidic acid. For example, stearic acid is a saturated alkyl carboxylic acid by which very thin nanorods but with a tendency of branching can be obtained. This is because stearic acid is a saturated alkyl carboxylic acid so that the alkyl chain is straighter than that of oleic acid. In this case, stearic acid can form a more packed and ordered array on the side of the produced nano-structures, which on one hand may limit the diameter of the final products, and on the other hand may also induce branching of the wires.

The invention claimed is:

1. A method of synthesising a nano-product comprising the steps of:
    a) providing a mixture of an M-alkoxide a first unsaturated carboxylic acid;
    b) heating the mixture for a pre-determined period of time to form an M-complex precursor, wherein the heating comprises solvothermally treating the mixture in a sealed autoclave; and
    c) subsequent to the step of forming the M-complex precursor, precipitating a nano-product of M-oxide from the M-complex precursor in the presence of a second mixture comprising at least each of a long chain unsaturated carboxylic acid, a nitrogen containing compound, and an organic compound,
    wherein M is an element, the oxide of which is suitable to form a nano-product, and the M-complex precursor is an ester complex.

2. A method of synthesising a nano-product as claimed in claim 1 wherein precipitating a nano-product of M-oxide from the M-complex precursor in step c) comprises:
    heating the M-complex precursor at a pre-determined temperature for a pre-determined period of time by heating the precursor to a predetermined temperature for a pre-determined time such that 180° C. renders an average diameter of 0.5 nm and heating the precursor to 300° C. renders a mean diameter of about 3 nm, wherein the higher the temperature, the greater the diameter of the nano-product, and increasing the time of heating the M-complex precursor to increase the lengths of the nano-product.

3. A method of synthesising a nano-product as claimed in claim 2, further comprising selecting the first unsaturated carboxylic acid such that the M-complex precursor is non-volatile at the temperature in which the M-complex precursor is heated.

4. A method of producing a nano-product as claimed in claim 1 wherein the weight ratio of the second carboxylic acid to the M-alkoxide is in the range between 100:3 and 1:1.

5. A method of synthesising a nano-product as claimed in claim 1 wherein the second carboxylic acid is oleic acid, whereby a linear nano-product is obtained.

6. A method of synthesising a nano-product as claimed in claim 1 wherein the nano-product is precipitated from the M-complex precursor in the presence of an unsaturated amine, whereby the nano-product is nitrogen-doped.

7. A method of producing a nano-product as claimed in claim 6 wherein:
    the weight ratio of the second carboxylic acid to the unsaturated amine during the precipitation of the nano-product is in the range between 1:1 and 1:2.

8. A method of synthesising a nano-product as claimed in claim 1 wherein the nano-product is precipitated from the M-complex precursor in the presence of a phosphorous containing dopant, whereby the nano-product is phosphorous-doped.

9. A method of synthesising a nano-product as claimed in claim 1 wherein the M-alkoxide is titanium alkoxide.

10. A method of synthesising a nano-product as claimed in claim 1 wherein the M-alkoxide is zirconium alkoxide.

11. A method of producing an atomic wire comprising the steps of claim 1, and further comprising the steps of precipitating M oxide to form atomic wires in the presence of a dopant, wherein the dopant forms a surface doping of the produced atomic wire.

12. A method of producing an atomic wire as claimed in claim 11 wherein the dopant is nitrogen provided by a nitrogen-containing organic compound such as organic amine.

13. A method of producing an atomic wire as claimed in claim 11 wherein the dopant is phosphorus provided by a phosphorus-containing organic compound.

14. A method of synthesising a nano-product comprising the steps of:
    a) providing a mixture of an M-alkoxide and an unsaturated carboxylic acid;
    b) heating the mixture for a pre-determined period of time to form an M-complex precursor in a sealed autoclave; and
    c) precipitating a nano-product of M-oxide from the M-complex precursor in the presence of a second unsaturated carboxylic acid, wherein M is an element, the oxide of which is suitable to form a nano-product, and the M-complex precursor is an ester complex, wherein the second carboxylic acid is stearic acid, whereby a branched nano-product is obtained.

15. A method of synthesising a nano-product as claimed in claim 14 wherein precipitating a nano-product of M-oxide from the M-complex precursor in step c) comprises:
    heating the M-complex precursor at a pre-determined temperature for a pre-determined period of time by heating the precursor to a predetermined temperature for a pre-determined time such that 180° C. renders an average diameter of 0.5 nm and heating the precursor to 300° C. renders a mean diameter of about 3 nm, wherein the higher the temperature, the greater the diameter of the nano-product; and
    increasing the time of heating the M-complex precursor to increase the lengths of the nano-product.

16. A method of synthesising a nano-product comprising the steps of:
    a) providing a mixture of an M-alkoxide and an unsaturated carboxylic acid;
    b) heating the mixture for a pre-determined period of time to form an M-complex precursor, wherein the heating comprises solvothermally treating the mixture in a sealed autoclave; and
    c) subsequent to the step of forming the M-complex precursor, precipitating a nano-product of M-oxide from the M-complex precursor in the presence of an unsaturated amine and in the presence of a second mixture comprising at least each of a long chain unsaturated acid, a nitrogen containing compound, and an organic compound, wherein M is an element, the oxide of which is suitable to form a nano-product, thereby producing a nitrogen-doped nano-product and the M-complex precursor is an ester complex.

* * * * *